Patented Apr. 11, 1950

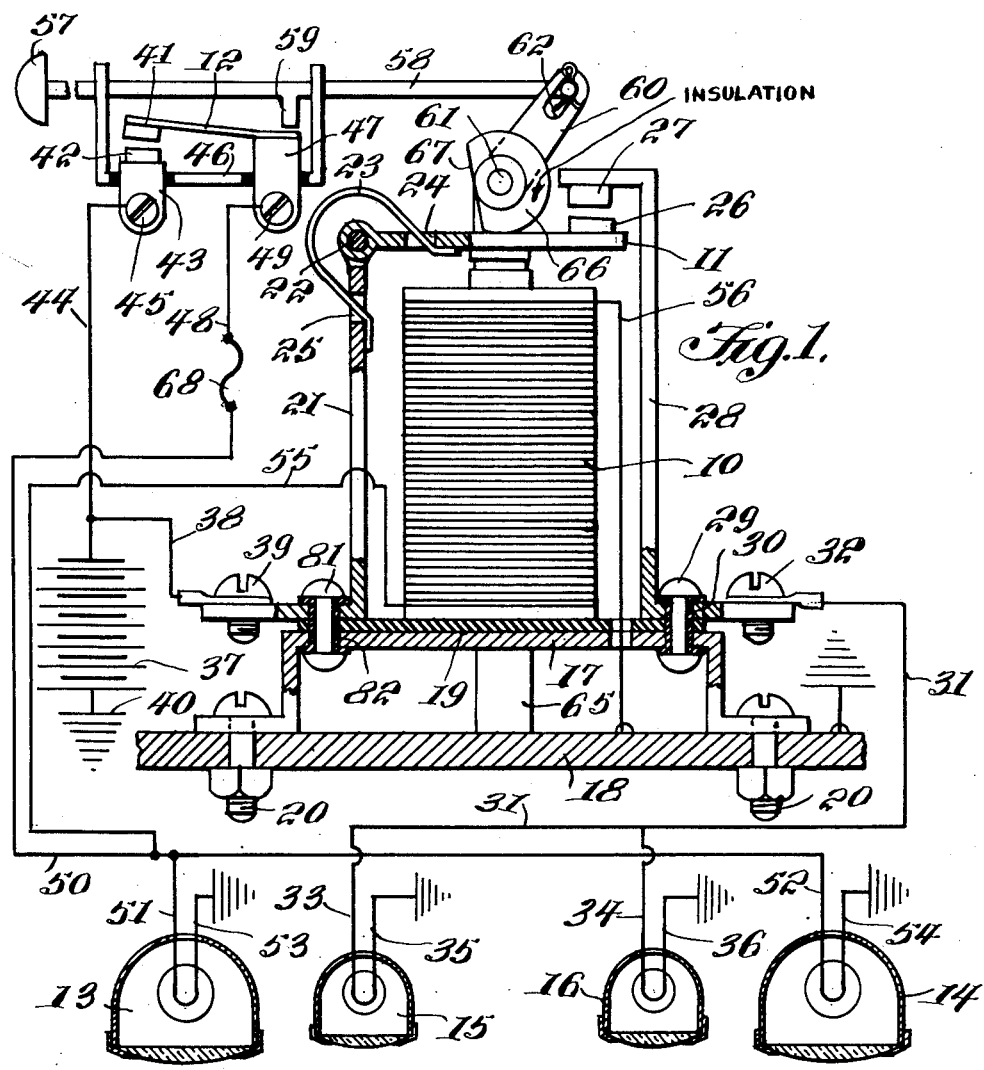
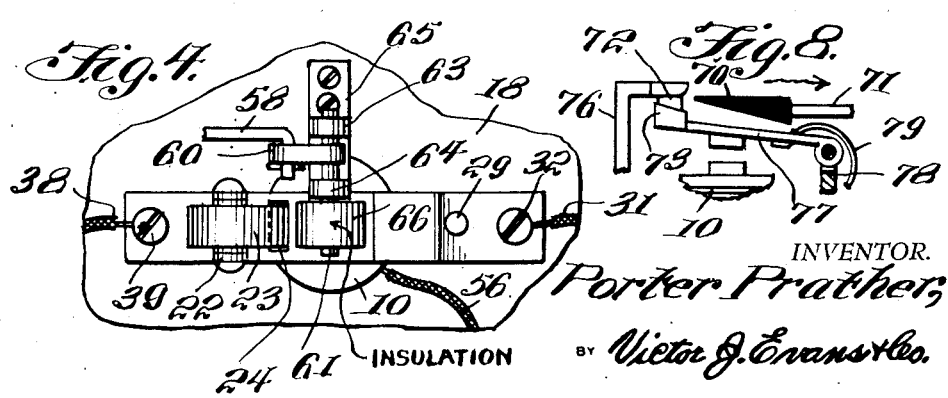

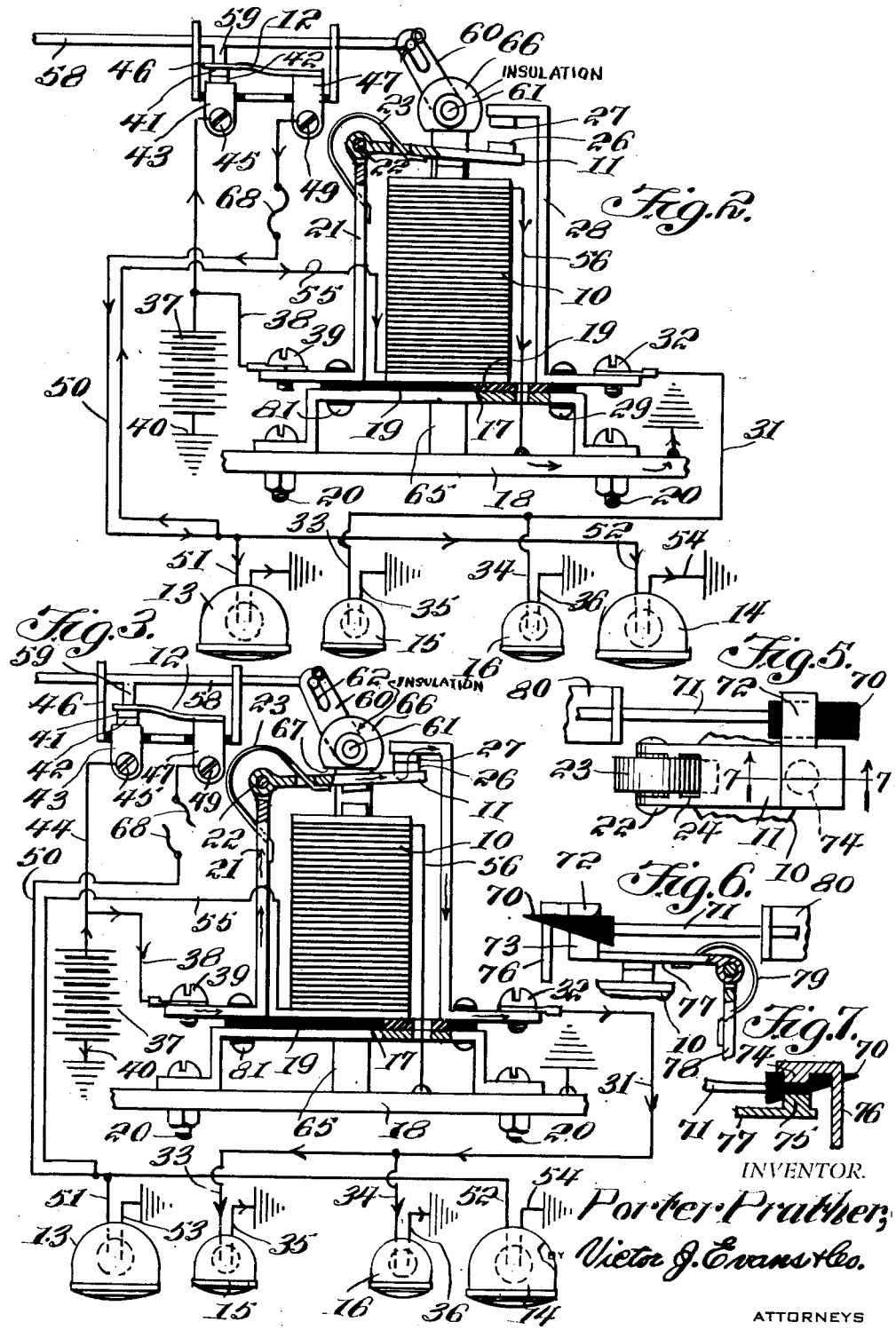

2,503,632

UNITED STATES PATENT OFFICE 2,503,632

AUTOMATIC ELECTRIC SWITCH

Porter Prather, Georgetown, Ky.

Application April 20, 1949, Serial No. 88,545

5 Claims. (Cl. 315—83)

This invention relates to emergency warning lights for use in combination with motor vehicle headlights, and in particular includes means for automatically completing a circuit to warning or auxiliary lights in combination with motor vehicle headlights when a fuse in the headlight circuit blows, or when the headlight circuit is broken.

The purpose of this invention is to provide means for automatically lighting warning lights in combination with motor vehicle headlights when the headlights are extinguished by a fuse in the circuit thereof breaking the circuit so that the danger of a motor vehicle proceeding without headlights, or without lights of any kind on the forward end thereof is substantially eliminated.

Numerous vehicles proceed on highways without headlights because the fuse in the headlight circuit blows and breaks the circuit and even though the operator of the vehicle may realize that the headlights are extinguished he is substantially helpless and usually proceeds to a filling station or garage. With this thought in mind this invention contemplates auxiliary emergency lights in combination with the usual headlights and an automatically operating switch which completes a circuit to the emergency lights when the fuse of the headlight circuit blows, or when the headlight circuit is broken by other means.

The object of this invention is, therefore, to provide a combination switch actuating means which is automatically set as the headlights of a motor vehicle are turned on and which automatically actuates circuits to emergency or auxiliary lights in combination with the headlights when the circuit to the headlights is broken.

Another object of the invention is to provide switch actuating means for completing a circuit to auxiliary lights as the main circuit to motor vehicle headlights is broken which is returned to the operative condition when a new fuse is inserted or the circuit to the headlights completed.

A further object of the invention is to provide emergency or auxiliary lights in combination with headlights of a motor vehicle and means for lighting the said lights as the circuit to the headlights is broken which is of a comparatively simple and economical construction.

With these and other objects in view the invention embodies a relay or switch having an electromagnet or solenoid connected in a circuit to motor vehicle headlights, and a switch that is held open by the solenoid as the solenoid is energized in which the switch is released to close a circuit to warning lights in combination with the headlights when the circuit to the headlights is broken.

Other features and advantages of the invention will appear from the following description taken in connection with the drawings wherein:

Figure 1 is a diagrammatic view with parts shown in section illustrating the arrangement of the switch actuating means in combination with circuits to the headlights and auxiliary emergency lights.

Figure 2 is a similar view showing the parts in the positions to which they have been actuated by drawing the headlight switch actuating button to the position in which the headlights are lighted.

Figure 3 is a similar view showing the fuse broken and the switch parts in the position of closing a circuit to the auxiliary lights.

Figure 4 is a detail showing a plan view of the switch of the auxiliary light circuit with the cam for actuating the switch and showing the outline of a solenoid below the switch.

Figure 5 is a similar view illustrating a modification wherein the switch is actuated by a wedge-shaped element instead of the cam.

Figure 6 is a side elevational view of the switch actuating elements illustrated in Figure 5.

Figure 7 is a detail showing a cross section through the switch parts taken on line 7—7 of Figure 5 and showing the wedge-shaped element in the position of holding the switch parts open.

Figure 8 is a similar view showing the wedge-shaped element withdrawn wherein the switch parts or contacts are closed.

Referring now to the drawings wherein like reference characters denote corresponding parts the emergency or auxiliary light circuit of this invention and the actuating means thereof includes a solenoid 10, an auxiliary light circuit switch 11, a main headlight circuit switch 12, and headlights 13 and 14 and auxiliary lights 15 and 16.

In the design shown the solenoid 10 is positioned on a bracket 17 on a base 18 with an insulating washer 19 between the solenoid and bracket and with the bracket secured to the base by bolts 20.

The auxiliary light circuit switch 11 includes an arm pivotally mounted on the upper end of a vertically disposed support 21 by a pin 22 and the arm is urged upwardly by a spring 23 one end of which extends through an opening 24 in the arm 11 and the other through an opening 25 in the support 21. The switch arm 11 is provided with a contact 26 that is positioned to engage a contact 27 on a post 28 which is mounted on the bracket 17 by a rivet 29 and the rivet is provided with an insulating sleeve 30 which prevents contact between the post and bracket. The lower end of the post is connected by a wire 31, which is secured thereby by a screw 32, to terminals of the auxiliary lights 15 and 16 through connecting wires 33 and 34. The opposite terminals of the lights 15 and 16 are grounded through wires 35 and 36. The contact 26 of the switch 11 is connected through the arm of the switch and the support 21 to a battery 37 through a wire 38 which is connected to the base of the support by a screw 39, and the opposite terminal of the battery is grounded through a wire 40.

The main headlight circuit switch 12 includes an arm with a contact 41 thereon that is positioned to engage a contact 42 on a clip 43 and the clip 43 is connected by a wire 44, which is connected to the clip by a screw 45, to the battery 37. The clip 43 is supported on a bracket 46 and the arm 12 of the switch extends from a similar clip 47 also carried by and insulated from the bracket, and the clip 47 is connected by a wire 48, to which it is connected by a screw 49, to one terminal of the headlights 13 and 14 by a wire 50 with connecting wires 51 and 52. The other terminals of the headlights are grounded by the wires 53 and 54, as shown.

The solenoid 10 is connected in series with the main headlight circuit switch 12 with a wire 55 connected to the switch by the wire 48 and connected at the opposite end to one terminal of the solenoid winding with the other terminal of the solenoid winding connected by a wire 56 to a ground through the base 18.

The button 57 represents the usual main headlight button on the instrument board of a motor vehicle and this is carried on the outer end of a rod 58 having a shoe 59 thereon and, as illustrated in Figure 1 when the button 57 is drawn outwardly the shoe 59 rides on the switch 12 closing the contacts and completing the circuit to the main headlights and also through the solenoid 10.

The inner end of the rod 58 is connected to a lever 60 on a shaft 61 through an elongated slot 62 and the shaft is journaled in bearings 63 and 64 of a base 65. A cam 66 having a flat side 67 is mounted on the shaft 61, and in the normal or daylight position with the headlights extinguished the cam holds the switch arm 11 downwardly as shown in Figure 1 with the switch to the auxiliary lights and also the switch 12 to the main headlights open, as illustrated in Figure 1. When the button 57 is drawn outwardly to light the main headlights the cam 66 is actuated to the position shown in Figure 2 wherein the arm of the switch 11 is released and the switch 12 closed by the shoe 59. In this position a circuit is completed to the main headlights and this also completes the circuit through the solenoid 10 which attracts the arm 11, holding the contacts 26 and 27 open so that the circuit to the auxiliary lights 15 and 16 is open, and when a fuse 68 in the main headlight circuit blows or should the circuit be broken by other means the circuit will be broken through the solenoid 10 and the arm of the switch 11 will be released whereby the spring 23 will actuate the arm upwardly closing the contacts 26 and 27 to the auxiliary circuit so that the emergency or auxiliary lights 15 and 16, which are positioned in combination with the main headlights, are instantly lighted when the main headlight circuit is broken.

The main circuit switch may also be formed as illustrated in Figures 5 to 8 inclusive wherein a wedge 70 which is carried by a rod 71 similar to the rod 58, and which is formed of insulating material, separates projecting elements 72 and 73 which opens contacts 74 and 75 similar to the contacts 26 and 27, the contact 74 being carried at the upper end of a post 76 similar to the post 28 and the contact 75 being positioned on the end of an arm 77 corresponding to the arm 11. In this design the arm 77 is pivotally mounted on the upper end of a support 78 similar to the support 21 and the arm is resiliently held upward by a spring 79 similar to the spring 23. The rod 71 of the switch actuator of this design is mounted in a bracket 80 corresponding to the bracket 46 of the design shown in Figure 1.

With the wedge 70 and also the cam 66 formed of insulating material and with the support 21 attached to the bracket 17 through a rivet 81 with a sleeve of insulating material 82 separating the rivet from the contacting surfaces, the actuating elements and also the supports therefor are insulated from the bracket 17 and base 18. The shoe 59 is also formed of insulating material and with the clips 43 and 47 insulated from the bracket 46 the switch 12 is completely insulated from the mounting elements.

With the parts arranged in this manner a circuit is completed to the emergency or auxiliary lights 15 and 16 as soon as a circuit to the main headlights is broken so that small lights are provided in combination with the headlights in an emergency, and as soon as the circuit is completed, or a new fuse inserted the circuits will immediately switch back to light the main headlights.

It will be understood that with the parts arranged in this manner other modifications may be made in the design without departing from the spirit and scope of the invention.

What is claimed is:

1. In combination with a motor vehicle main headlight circuit switch, an auxiliary switch, auxiliary lights, an auxiliary circuit, a main headlight switch actuating button having a bar extended therefrom with means thereon for holding the said main headlight circuit switch and the said auxiliary switch open, said means releasing the said auxiliary switch and closing the main headlight circuit switch to light the headlights, and means actuated by the circuit of the main headlights for temporarily retaining the auxiliary switch in the open position while the headlight circuit switch is closed, said means releasing the said auxiliary switch for closing the auxiliary circuit to light the auxiliary lights when the main headlight circuit is broken.

2. In combination with a motor vehicle main headlight circuit switch, an auxiliary switch, auxiliary lights, an auxiliary circuit, a main headlight switch actuating button having a bar extended therefrom with means thereon for holding the said main headlight circuit switch and the said auxiliary switch open, said means releasing the said auxiliary switch and closing the main headlight circuit switch to light the headlights, and a solenoid actuated by the circuit of the main headlights for temporarily retaining the said auxiliary switch in the open position while the headlight circuit switch is closed, said means de-energizing the solenoid, whereby the said auxiliary switch is closed when the main headlight circuit is broken.

3. In a motor vehicle headlight circuit, the combination which comprises a pair of headlights, a headlight circuit in which said headlights are positioned, a headlight circuit switch in the said headlight circuit, a solenoid connected in series with said headlight circuit, an auxiliary switch positioned to be held open by the solenoid, a pair of auxiliary emergency lights, an auxiliary light circuit in which the said auxiliary switch is positioned, and an actuator for the headlight switch including means retaining the said auxiliary switch open when the headlight switch is open and means releasing said auxiliary switch when the headlight switch is closed, and said solenoid holding said auxiliary switch open until the headlight circuit is broken.

4. In a motor vehicle headlight circuit, the combination which comprises a pair of headlights, a headlight circuit in which said headlights are positioned, a headlight circuit switch in the said headlight circuit, a solenoid connected in series with said headlight circuit, an auxiliary switch positioned to be held open by the solenoid, a pair of auxiliary emergency lights, an auxiliary light circuit in which the said auxiliary switch is positioned, and an actuator for the headlight switch including a cam-like element for retaining the said auxiliary switch open when the headlight switch is open and said cam-like element releasing said auxiliary switch when the headlight switch is closed, and said solenoid holding said auxiliary switch open until the headlight circuit is broken, whereby the circuit to the solenoid is also broken and the circuit to the auxiliary lights is completed.

5. In a motor vehicle headlight circuit, the combination which comprises a pair of headlights, a headlight circuit in which said headlights are positioned, a headlight circuit switch having a contact arm positioned in said headlight circuit, a solenoid connected in series with said headlight circuit, an auxiliary switch also having a contact arm positioned to be held open by the solenoid, a pair of auxiliary emergency lights, an auxiliary light circuit in which said auxiliary switch arm is positioned, and a headlight button having a bar with cam elements thereon extended therefrom and said cam elements positioned to engage the arms of the main headlight and auxiliary switches whereby the auxiliary switch is held open while the main headlight switch is open and the auxiliary switch arm is released by one of the cam elements of the bar of the button as the main headlight switch is closed by another of the cam elements of the bar of the button, said solenoid holding the auxiliary switch open until the headlight circuit is accidentally broken at which time the circuit to the solenoid is also broken thereby completing the circuit to the auxiliary lights.

PORTER PRATHER.

REFERENCES CITED

The following references are of record in the file of this patent:

UNITED STATES PATENTS

| Number | Name | Date |
|---|---|---|
| 2,381,169 | Jones | Aug. 7, 1945 |